United States Patent Office 3,251,848
Patented May 17, 1966

3,251,848
VAPOR PHASE PRODUCTION OF 2-CHLORO-PYRIDINE AND 2,6-DICHLOROPYRIDINE
William H. Taplin III, Concord, Calif., assignor to The Dow Chemical Company, Midland, Mich., a corporation of Delaware
No Drawing. Filed Nov. 12, 1963, Ser. No. 323,109
4 Claims. (Cl. 260—290)

The present invention is directed to a process for the production of 2-chloropyridine and 2,6-dichloropyridine in the vapor phase.

Although 2-chloropyridine and 2,6-dichloropyridine have been produced in the vapor phase, the yields of the product have been very poor. Moreover, the known methods have always been accompanied by extensive tar formation as well as production of undesirable by-products in major quantities. Both 2-chloropyridine and 2,6-dichloropyridine are very useful as intermediates for the preparation of many substituted pyridines and pyridyl substituted compounds. 2-chloropyridine is also useful as nitrification inhibitor and pesticide. 2,6-dichloropyridine is also useful as an anthelmintic. Hence, it is seen that there is a need for methods whereby these compounds may be produced in good yields.

It is an object of this invention to provide a method for producing 2-chloropyridine in good yields substantially free of tar and undesirable by-products. It is a further object of the present invention to provide a method for producing 2,6-dichloropyridine in good yields, substantially free of tar and undesirable by-products.

According to the present invention, it has been discovered that either 2-chloropyridine or 2,6-dichloropyridine is prepared in good yields as a single major component substantially free of tars and undesirable by-products in a method whereby a pyridine vapor component and gaseous chlorine are rapidly mixed in turbulent contact at temperatures appropriate for the particular product desired.

By "pyridine vapor component" is meant either undiluted pyridine vapor or a mixed vapor of pyridine and an inert diluent. Suitable diluents are perchlorinated hydrocarbons such as carbon tertachloride, tetrachloroethylene and hexachlorobutadiene. Carbon tetrachloride is the preferred diluent. By suitable modificatiion of reaction temperatures as hereinafter more specifically set forth, 2-chloropyridine may be prepared in the absence of added diluent, the excess chlorine serving a diluent function.

In carrying out the process of the present invention, pyridine vapor or mixed vapors of pyridine and diluent are rapidly mixed in turbulent contact with excess of gaseous chlorine during a brief contact time at temperatures specific for the particular chloropyridine product desired.

It is critical and essential for the production of the desired products in good yields and the avoidance of extensive degradation and tar formation that there be at least a stoichiometric requirement of chlorine for the particular chloropyridine product throughout the operation. It is highly desirable that there be substantial excess of chlorine over the stoichiometric requirement. This is true whether or not a separate diluent is employed. The ratios of chlorine to pyridine for the preparation of 2-chloropyridine are from 1:1 to 4:1 or higher. The ratios of chlorine to pyridine for the preparation of 2,6-dichloropyridine are from 2:1 to 5:1 or higher. In carrying out the preparation, the unreacted or incompletely reacted pyridine materials are recycled.

Temperatures suitable for carrying out the reaction are governed primarily by the product desired. The temperatures suitable for the preparation of 2-chloropyridine are from 260° C. or lower to about 295° C. The preferred temperature range varies with the use or non-use of diluent. When 2-chloropyridine is prepared from chlorine and pyridine without use of diluent, the reaction is preferably carried out at the lower range of temperatures. Thus, at about 265° C., the yield of product approaches 100 percent, while at temperatures of about 280° C., the yield is slightly decreased but at about 300° C., carbonization occurs. When diluent such as carbon tetrachloride is employed, the preferred temperatures appear to be in the intermediate areas of the temperature range. The temperatures suitable for the preparation of 2,6-dichloropyridine are from about 370° C. to about 395° C. and diluent must be employed.

When diluent is employed for the preparation of either product, suitable mole ratios of diluent to pyridine are from about 3:1 to about 54:1.

Although the exact residence time is not critical, the reactants should not be permitted to remain in contact for a prolonged period. The contact period or residence time depends on the temperature within the operable ranges of temperatures for the particular product. Thus, lowering the temperature ten degrees may double the permissible residence time but will ultimately be limited by the required minimum temperature for accomplishing the desired result. Residence time will not generally exceed 5 to 6 minutes. The preferred time for contact is from about 5 to 15 seconds.

Operating pressures are not critical and may vary from subatmospheric to superatmospheric. Atmospheric pressure is satisfactory and is preferred.

In carrying out the reaction for the preparation of 2-chloropyridine or 2,6-dichloropyridine, pyridine and diluent, if employed, are vaporized in a suitable evaporator to produce pyridine vapor or pyridine vapor in an inert diluent vapor. The pyridine vapor or mixed vapors are produced by introducing pyridine and diluent, if employed, into an evaporator maintained in the temperature range of from about 100° C. to about 180° C. Any vaporizing device may be employed as evaporator but a wiped film evaporator has been found convenient. It is essential, however, that vaporization be carried out so as to completely vaporize the pyridine and maintain it in the vaporized state. It has been noted that incomplete vaporization results in decreased yield of the desired chlorinated product.

In the preparation of 2-chloropyridine, the vapor or vapors produced as above described are mixed with gaseous chlorine, preferably at a point prior to but close to the point of entry to the reactor and the resulting gaseous mixture introduced into a heated reactor at a rapid rate and in a turbulent flow where, in the vapor phase, a reaction takes place in the temperature range of from about 260° C. to about 295° C. with the formation of 2-chloropyridine in good yields.

In the preparation of 2,6-dichloropyridine, the vapor mixture produced as above described is mixed with gaseous chlorine, preferably at a point prior to but close to the point of entry to the reactor and the resulting gaseous mixture introduced into a reactor heated to a temperature of at least 370° C. at a rapid rate and in a turbulent flow where in the vapor phase, a reaction takes place in the temperature range of from about 370° C. to about 395° C. with the formation of 2,6-dichloropyridine in good yields.

In the foregoing step for the preparation of 2-chloropyridine or 2,6-dichloropyridine, the vapors of pyridine in diluent and gaseous chlorine may be simultaneously but separately introduced into the reactor, but in such case, the gaseous chlorine must be jetted in at a point close to the point of introduction of the pyridine-diluent vapor in such manner to ensure very rapid mixing and turbulent flow of reactants. The turbulence must be such as to provide a Reynolds number of at least 800. The preferred Reynolds number is about 2000. The actual vapor velocity is not critical. Generally, an inlet vapor velocity of about 50 to 100 feet per second is considered desirable. The reactor should be properly insulated to permit the reaction to take place under adiabatic conditions. The vapors passing from the reactor are quenched to separate (a) a liquid composition containing the desired product, diluent, starting materials and by-products from (b) a gaseous mixture containing chlorine and hydrogen chloride by-product. The desired 2-chloropyridine or 2,6-dichloropyridine may be recovered in good yields from the liquid fraction by fractional distillation, preferably, preceded by neutralization of the acidic liquid with alkali. They may be further purfied, if desired, by methods well-known to the skilled in the art. The gaseous mixture may be scrubbed according to conventional procedures to separate chlorine from hydrogen chloride. The former may be dried and recycled and the latter may be recovered as hydrochloric acid.

The following examples illustrate the invention but are not to be construed as limiting:

Example 1.—2-chloropyridine

Pyridine, at a rate of 5.3 moles per hour and carbon tetrachloride, at a rate of 59 moles per hour were metered into a preheater maintained at about 140° C. to vaporize the pyridine and carbon tetrachloride and the resulting vapor mixture was conducted to a reactor where, just prior to the entry port of the reactor, chlorine was metered into the vapor flow at a rate of 33 moles per hour and the resulting mixed gases introduced into a reactor heated to a temperature of 280° C. with rapid mixing and turbulent flow whereupon a reaction took place with the formation of a 2-chloropyridine product composition. Vapor phase chromatographic (V.P.C.) analysis of the product composition through a column calibrated against authentic pyridine and chloropyridines showed the yield of 2-chloropyridine product to be 74.5 mole percent. The remaining materials in the composition were 10.5 mole percent of unreacted pyridine and 15 mole percent of 2,6-dichloropyridine.

Example 2.—2,6-dichloropyridine

Pyridine, at a rate of 1.1 moles per hour and carbon tetrachloride at a rate of 7.1 moles per hour were metered into a preheater maintained at about 280° C. to vaporize the pyridine and carbon tetrachloride and the resulting vapor mixture was conducted to a reactor where, just prior to the entry port of the reactor, chlorine was metered into the vapor flow at a rate of 7.0 moles per hour and the resulting mixed gases introduced into a reactor heated to a temperature of 390° C. with rapid mixing and turbulent flow whereupon a reaction took place with the formation of a 2,6-dichloropyridine product composition at a rate of 140 grams per hour. Vapor phase chromatographic (V.P.C.) analysis of the product compositions through a column calibrated against authentic pyridine and chloropyridines showed a yield of 87 percent of product composition of which 75.5 mole percent of the composition was the desired 2,6-dichloropyridine product.

Example 3.—2-chloropyridine

In a manner similar to that described in Example 1, 42.75 pounds of pyridine was vaporized in a preheater at 110° C. and mixed with carbon tetrachloride vapor cycled at a rate of 32.5 pounds per hour and the resulting vapor mixture and chlorine at a rate of 30 moles per hour introduced into a reactor heated to a temperature of 280° C. with rapid and turbulent mixing. The reaction was continued for 35 hours by recycling the reactants during which time a reaction took place with the formation of 57.1 pounds of a 2-chloropyridine composition. The prodduct composition (as determined by V.P.C. analysis) contained 53 pounds of 2-chloropyridine amounting to an 86 percent yield of product.

Example 4.—2-chloropyridine

In a similar operation, 1.52 pounds of vaporized pyridine at a rate of 4.35 moles per hour and chlorine at a rate of 36.8 moles per hour were preheated and thereafter introduced into a reactor heated to a temperature of 265° C. and the operation continued for two hours by recycling the reactants to obtain a 2-chloropyridine product composition. The product mixture was neutralized with alkali and separated from the brine phase to recover 1.75 pounds of product composition containing 47.6 weight percent 2-chloropyridine and 52.6 percent pyridine (as determined by V.P.C. analysis). The yield of the product is 0.83 pound or 95.4 percent of theoretical based on pyridine consumed.

Example 5.—2-chloropyridine

In a similar operation 0.62 pound of vaporized pyridine at a rate of 4.35 moles per hour and chlorine at a rate of 36.8 mole per hour were preheated and thereafter introduced into a reactor heated to 280° C. and the operation continued for 50 minutes by recycling the reactants to obtain a 2-chloropyridine product composition. The product mixture was neutralized with alkali and separated from the brine phase to recover 0.825 pound of product composition containing 49.6 weight percent 2-chloropyridine, 49.6 weight percent pyridine and 16.7 weight percent carbon tetrachloride (as determined by V.P.C. analysis). The yield of the product is 0.41 pound or 83 percent of theoretical based on pyridine consumed.

The products prepared by the process of the present invention are useful as intermediates in the preparation of chemicals and pharmaceutical agents. They are also useful in agronomy and animal husbandry. Thus, for example, 2-chloropyridine is useful as a nitrification inhibitor. In such operation, a composition comprising ammonium nitrogen fertilizer and 2-chloropyridine when employed to treat seed beds of nitrate and nitrite free sandy loam soil having a pH of about 8 by applying thereto at a rate sufficient to supply 10 parts by weight of 2-chloropyridine based on weight of soil and the treated soil incubated for about 1 week at about 70° F. showed substantially complete inhibition of nitrification of the added ammonium nitrogen. 2,6-dichloropyridine, on the other hand, is particularly useful as an anthelmintic. In a representative operation, 2,6-dichloropyridine when incorporated into feed in an amount of 0.06 percent by weight of feed, the feed fed to mice infected with tapeworm for seven days and thereafter the mice sacrificed and examined for tapeworms, was seen to give complete controls of tapeworms.

I claim:

1. A process for the production of 2,6-dichloropyridine in the vapor phase which comprises rapidly mixing in a turbulent flow, chlorine and a vapor mixture of pyridine and perchlorinated hydrocarbon diluent at temperatures in the range of from about 370° to about 395° C. wherein at least a stoichiometric requirement of chlorine is employed throughout the reaction.

2. A process for the production of 2-chloropyridine in the vapor phase which comprises rapidly mixing in a turbulent flow, excess chlorine and pyridine vapor at temperatures in the range of from about 260° to about 295° C.

3. A process for the production of 2-chloropyridine in the vapor phase which comprises rapidly mixing in a turbulent flow, excess chlorine and pyridine vapor at temperatures in the range of from about 260° C. to about 295° C. wherein in the foregoing process, the mixing is carried out with such turbulence as to provide a Reynolds number of at least 800.

4. A process for the production of 2,6-dichloropyridine in the vapor phase which comprises (a) mixing pyridine vapor and perchlorinated hydrocarbon vapor, and (b) rapidly mixing in a turbulent flow, chlorine and vapor mixture of pyridine and perchlorinated hydrocarbon at temperatures in the range of from about 370° C. to about 395° C., wherein in the foregoing process, there is at least a stoichiometric requirement of chlorine throughout the operation and the mixing is carried out with such turbulence as to provide a Reynolds number of at least 800.

References Cited by the Examiner
UNITED STATES PATENTS

| 1,977,662 | 10/1934 | Wibaut et al. | 260—290 |
| 2,820,791 | 1/1958 | Shermer | 260—290 |
| 2,839,534 | 6/1958 | Shrader et al. | 260—290 |
| 3,153,044 | 10/1964 | Zaslowsky | 260—290 |

WALTER A. MODANCE, *Primary Examiner.*
NICHOLAS S. RIZZO, *Examiner.*
MARION W. WESTERN, *Assistant Examiner.*